United States Patent [19]

Paul, III

[11] 4,165,426

[45] Aug. 21, 1979

[54] ZINC OXIDE CURED POLYSULFIDE POLYMERS CONTAINING LEVULINIC ACID SUITABLE FOR HOT MELT APPLICATION

[75] Inventor: Henry N. Paul, III, Philadelphia, Pa.

[73] Assignee: Thiokol Corporation, Newtown, Pa.

[21] Appl. No.: 913,627

[22] Filed: Jun. 8, 1978

[51] Int. Cl.² ............................................. C08G 75/04
[52] U.S. Cl. ................................ 528/374; 264/176 R; 264/236; 264/331; 264/347; 427/355; 427/385 R; 427/385 A; 427/388 R; 428/419; 428/426; 428/457; 528/388
[58] Field of Search ............... 528/374, 388; 264/176, 264/236, 331, 347; 427/355, 385 R, 388 R, 385 A; 260/45.85 R; 428/419, 426, 457

[56] References Cited

U.S. PATENT DOCUMENTS 2,466,963   4/1949   Patrick et al. ...................... 260/829

*Primary Examiner*—Melvyn I. Marquis
*Attorney, Agent, or Firm*—Stanley A. Marcus; Royal E. Bright

[57] ABSTRACT

Incorporation of levulinic acid into zinc oxide cured systems based on thiol terminated polysulfide polymers results in cured rubbers capable of extrusion under heat and pressure. The products are useful in sealants and in fabrication of solvent resistant hoses and other extruded articles.

7 Claims, No Drawings

ZINC OXIDE CURED POLYSULFIDE POLYMERS CONTAINING LEVULINIC ACID SUITABLE FOR HOT MELT APPLICATION

BACKGROUND OF THE INVENTION

This invention relates to the art of polysulfide polymers, more particularly to thiol terminated liquid polysulfide polymers and hot melt applications, such as, hot melt applied sealants, extrusion of hoses and the like.

The use of thiol terminated liquid polysulfide polymer in caulks, sealants and the like for numerous applications is well known. Such materials have normally, until now, been chemically cured in situ.

When rapid cure was desired, a two part system was necessary requiring mixing with proper equipment just before use. One part chemical cure, on the other hand, was satisfactory but required that provision be made for time to reach structural integrity, in some uses requiring provision of storage facilities, support racks and the like. In production applications, the extra space and/or equipment added a cost factor which those skilled in the art would consider it desirable to eliminate.

Hot melt applied materials offer the potential to eliminate both the two part chemical cure requirement of in situ mixing and the lengthy holding requirement of one part chemical cure.

Although polysulfide rubbers are classified with other thermoplastic materials, the art has always considered that if a cured polysulfide polymer, or indeed most vulcanized rubbers, were to be heated to a point at which plastic flow was possible, irreversible degradation of the polymeric chain would follow and that upon cooling the resulting properties would be far poorer. In addition, a known degradation reaction of polysulfide polymeric chain occurs upon heating in the presence of acids.

That the incorporation of substantially anhydrous acetic acid in zinc oxide cured thiol terminated liquid polysulfide polymers results in cured rubbers capable of extrusion under heat and pressure with recovery of good properties on cooling is taught in the application of Eugene R. Bertozzi, Ser. No. 913,630, filed concurrently herewith. Screening of other carboxylic acids, both those structurally similar to acetic acid, and those more remote, has surprisingly revealed that of those tested, only levulinic acid is able to provide to a zinc oxide cured thiol terminated liquid polysulfide polymer the ability to be extruded in a fashion similar to the acetic acid containing cured polymers with recovery of good properties.

Up until now, the available hot melt sealants, such as butyl based materials, have not exhibited good structural properties on cooling and have required cumbersome mechanical retention systems or the application of a second curable sealant where some rigidity in the sealant is necessary as in glass sandwiches for insulated windows.

The present invention provides the ease of hot melt application with the structural support and other good properties obtainable from polysulfide polymer sealants.

SUMMARY OF THE INVENTION

The invention provides a cured rubbery composition based on a thiol terminated liquid polysulfide polymer which comprises the reaction product of a liquid thiol terminated polysulfide polymer, zinc oxide and levulinic acid.

The tangible embodiments of this composition aspect possess the inherent applied use characteristic of being extrudable under heat and pressure to form a bead which is a rubbery solid at room temperature and while in the flowable state has the ability to wet glass, aluminum, concrete, ceramic, wood and other common architectural materials, thus evidencing usefulness as a hot melt type sealant for insulating glass window sandwiches, for windows in vehicles for rail and highway travel, in the prefabrication of building components and the like.

The invention also provides a process for the preparation of a cured polysulfide rubber based on a thiol terminated liquid polysulfide polymer, said cured rubber being capable of extrusion under heat and pressure with recovery of substantially its original physical properties on cooling, which comprises:

(a) blending a thiol terminated liquid polysulfide polymer, zinc oxide and levulinic acid; and (b) allowing the blend prepared in step (a) to cure.

The invention also provides a process for the preparation of an article of manufacture comprising a substrate having a cured rubber based on a thiol terminated liquid polysulfide polymer on at least one surface thereof which comprises:

(a) extruding a thiol terminated liquid polysulfide based rubber cured with zinc oxide and levulinic acid under heat and pressure onto a substrate; and (b) allowing said extruded rubber of step (a) to cool and solidify.

The invention also provides a curable composition which comprises a thiol terminated liquid polysulfide polymer, zinc oxide and levulinic acid The invention also provides an article of manufacture comprising a substrate having on at least one surface thereof a cured rubber extruded under heat and pressure said rubber comprising the reaction products of a thiol terminated liquid polysulfide polymer, zinc oxide and levulinic acid.

DESCRIPTION OF THE PREFERRED EMBODIMENT

The manner of making and using the compositions and processes of the invention will now be described with reference to a specific embodiment thereof; namely, a cured rubber (I) based on a thiol terminated liquid polysulfide polymer of the general formula:

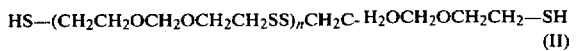

$$HS-(CH_2CH_2OCH_2OCH_2CH_2SS)_nCH_2C-H_2OCH_2OCH_2CH_2-SH$$
(II)

wherein n is sufficient to give an average molecular weight of about 7500 and containing about 0.5% random crosslinking introduced by incorporation of trichloropropane in the original polysulfide polymer condensation.

To prepare I, II may be blended in conventional mixing equipment, conveniently in such fahsion as to avoid entrainment of air in the blend, with a curing amount of zinc oxide, conveniently from about 1 parts by weight (pbw) to about 50 pbw per hundred pbw liquid polysulfide polymer, preferably from about 2 pbw to about 20 pbw, and an effective amount of levulinic acid, conveniently from about 0.5 pbw to about 5 pbw per hundred pbw of polysulfide polymer, preferably from about 1 pbw to about 3 pbw. The blended polymer and curing agents may then be formed into any desired shape by conventional techniques; such as, casting in a mold or by extrusion as a tape. Cure may take place either at room temperature or obviously more quickly at elevated temperatures such as about 70° C.

One skilled in the art will recognize that in addition to the thiol terminated liquid polysulfide polymer II illustrated herein above, other polysulfide polymers of the general formula:

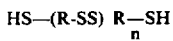

wherein n is 4 up to a value sufficient to give a molecular weight of about 10,000, which may be uncrosslinked or contain up to about 2% crosslinking and wherein R is a hydrocarbon, oxahydrocarbon or thiahydrocarbon diradical such as the ethylene radical

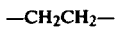

the butylene radical

the diethylether diradical

the diethylformal diradical

and the like will be suitable for the preparation of compounds of the invention.

U.S. Pat. No. 2,466,963 teaches the synthesis of this type of polymer. A number of these polymers are commercially available from Thiokol Corporation.

In the processes for the use of the compositions of the invention, their application by the use of conventional equipment is contemplated. For example, a cured ribbon of I may be extruded under heat and pressure from a heated screw-type extruder gun. Their use in replacing currently used chemically cured polymers, as well as current hot applied materials and mechanical supports or secondarily applied chemically cured supporting compositions, are contemplated. For example, I may be extruded as above directly into the edges of a channel between two pieces of window glass. Upon cooling, the unit so formed will be mechanically strong enough for further processing.

The temperatures employed for hot melt application may be those commonly employed in conventional hot melt processing; desirably they will be sufficient to cause relatively easy plastic flow from the extrusion equipment without being excessively high so as to cause obvious substantial decomposition or reversion to a permanent liquid or excessively soft solid in a small test sample. Conveniently, these temperatures may range from about 170° C. to about 250° C., preferably about 220° to about 240° C.

Levulinic acid (acetopropionic acid) is commercially available.

In the use of the compositions of the invention, the optional incorporation of standard fillers, reinforcing agents, extenders, adhesive additives, flow control agents, cure rate modifiers, and the like as would normally be employed by a chemist skilled in the relevant art in preparing a formulation for a particular use is comprehended by the specification and the appended claims.

The following examples further illustrate the best mode contemplated by the inventor for the practice of his invention.

EXAMPLE 1

II illustrated hereinabove (100 parts by weight (pbw)) and zinc oxide (2.2 pbw) are blended with the additives shown in the table below in the quantities indicated and cure attempted as indicated.

|  | Cure Condition | | | |
|---|---|---|---|---|
|  | 24 hrs. (22° C.) | | 15 min. (200° C.) | |
| Additive | 0.5 pbw | 2.0 pbw | 0.5 pbw | 2.0 pbw |
| Glacial Acetic Acid | cured | cured | cured | cured |
| Maleic Acid | not cured | not cured | not cured | not cured |
| Butyrolactone | not cured | not cured | not cured | not cured |
| Fumaric Acid | not cured | not cured | not cured | not cured |
| Succinic Acid | not cured | not cured | not cured | not cured |
| Malonic Acid | not cured | not cured | not cured | not cured |
| Levulinic Acid | cured | cured | cured | cured |
| Tannic Acid | not cured | not cured | not cured | not cured |
| Tartaric Acid | not cured | not cured | not cured | not cured |
| Adipic Acid | not cured | not cured | not cured | not cured |
| Benzoic Acid | not cured | not cured | not cured | not cured |
| Citric Acid | not cured | not cured | not cured | not cured |
| Diacetyl | not cured | not cured | not cured | not cured |
| Lactic Acid | not cured | not cured | not cured | not cured |

EXAMPLE 2

Polysulfide polymer II (100 pbw) was blended with either zinc oxide at levels of 1, 2, 5, 10, 20 pbw or levulinic acid at levels of 1, 2, 5, 10 pbw. No cure of any blend was obtained at room temperature.

| | Sample No. | | | | | | | | | | | | | | |
|---|---|---|---|---|---|---|---|---|---|---|---|---|---|---|---|
| Ingredient | 1 | 2 | 3 | 4 | 5 | 6 | 7 | 8 | 9 | 10 | 11 | 12 | 13 | 14 | 15 |
| II | 100 | 100 | 100 | 100 | 100 | 100 | 100 | 100 | 100 | 100 | 100 | 100 | 100 | 100 | 100 |
| Zinc Oxide | 1 | 2 | 5 | 10 | 20 | 1 | 2 | 5 | 10 | 20 | 1 | 2 | 5 | 10 | 20 |
| Levulinic Acid | 1 | 1 | 1 | 1 | 1 | 2 | 2 | 2 | 2 | 2 | 5 | 5 | 5 | 5 | 5 |
| Work Life (min.) | — | — | — | — | — | — | — | — | — | 25 | — | — | — | — | — |
| Physical Properties | | | | | | | | | | | | | | | |
| Cure at RT Durometer | | | | | | | | | | | | | | | |
| (Shore A): 1 hr. | 2 | 25 | 33 | 45 | 48 | 2 | 23 | 40 | 40 | 43 | NC* | 5 | 30 | 30 | — |
| 6 hrs. | 2 | — | — | — | 50 | — | — | 44 | 44 | 44 | NC | — | 32 | 35 | 35 |
| 1 day | 3 | 42 | 44 | 47 | — | 2 | 39 | — | — | — | — | 6 | — | — | — |
| 1 week | 3 | 43 | 44 | 46 | 48 | 2 | 39 | 43 | 44 | 44 | NC | 6 | 47 | 53 | 53 |
| Tensile (psi) (est) 1 day | 0 | 100 | 200 | 250 | 300 | wet | 250 | 200 | 300 | 375 | wet | 5 | 100 | 100 | 80 |
| Elongation (%) (est) | 700 | 300 | 275 | 300 | 140 | wet | 250 | 275 | 325 | 175 | wet | 1700 | 2000 | 1000 | 1400 |

-continued 1 day

*NC = no cure

| Ingredient | Sample No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| II | 100 | 100 | 100 | 100 | 100 | 100 | 100 | 100 | 100 | 100 | 100 | 100 |
| Zinc Oxide | 3 | 3.5 | 4 | 3.5 | 3.5 | 3.5 | 10 | 10 | 10 | 6 | 7 | 9 |
| Levulinic Acid* | 1 | 1 | 1 | 0.8 | 1 | 1.5 | 1 | 1 | 1 | 1 | 1 | 1 |
| Santicizer 278 | — | — | — | — | — | — | 5 | 10 | 20 | — | — | — |
| Work Life (min.) | 50 | 40 | 45 | 67 | — | 30 | 37 | 40 | 35 | 30 | 30 | 30 |
| Physical Properties | | | | | | | | | | | | |
| Durometer (Shore A): | | | | | | | | | | | | |
| 1 hr. | — | 5 | 5 | NC** | — | 35 | 35 | 25 | 20 | 35 | 34 | 34 |
| 6 hrs. | 40 | 41 | 43 | 43 | — | 44 | 40 | 40 | 30 | 43 | 45 | 43 |
| 1 day | 44 | 45 | 44 | 45 | — | 44 | 40 | 40 | 33 | 45 | 45 | 45 |
| Tensile (psi) (est) 1 day | 300 | 100 | 230 | 300 | — | 250 | 300 | 300 | 175 | 250 | 300 | 300 |
| Elongation (%) (est) 1 day | 275 | 300 | 375 | 330 | — | 425 | 399 | 350 | 390 | 300 | 300 | 310 |

*Santicizer 278 is a proprietary phthalate plasticizer supplied by Monsanto Co.
**NC = no cure

EXAMPLE 5

A thiol terminated polysulfide polymer having 2% cured cross-linking based on dichloroethylformal of average molecular weight about 4000 (100 pbw) is blended with neutral clay (45 pbw), titanium dioxide (15 pbw) Santicizer 154, a proprietary plasticizer supplied by Monsanto Co. (12.5 pbw), Chlorowax 70, a chlorinated paraffin plasticizer supplied by Diamond Shamrock (12.5 pbw), stearic acid (0.3 pbw), zinc oxide (5 pbw), A-187, a silane adhesive additive supplied by Union Carbide (1 pbw) and Cumar P-25, a cumarone indene resin supplied by Allied Chemical Corp. (20 pbw). To this blend is added a 1:1 mixture of levulinic acid and Santicizer 278 (3.4 pbw). A tape made from this blend required 24 hours to cure, had a Durometer (Shore A) of 36, a tensile strength (estimated) of 200 psi and an elongation percentage (estimated) of 190. The tape fed well into a screw extrusion gun at an optimum temperature of 400° F. with good ease of extrusion, showed fair wetting of an aluminum or glass surface and fair workability with a spatula blade. The durometer of the extrudate after 10 minute cooling period was 25 Shore A and it had a tensile of 150 psi (estimated) and an elongation of 260% (estimated) with an acceptable appearance. Beads extruded onto dry glass and dry aluminum showed cohesive failure in the sealant prior to rupture of the bond to the substrate.

EXAMPLE 6

The following example illustrates that, in addition to hot melt applications, conventional 2 part chemically cured polysulfide based sealants may be formulated using a zinc oxide levulinic acid curative.

A polysulfide polymer similar to that of Example 5 (100 pbw) is blended with calcium carbonate (55 pbw), titanium dioxide (15 pbw), chlorowax 70 (12.5 pbw), Santicizer 154 (12.5 pbw), Thixcin GR (a castor oil based thixotropic agent supplied by National Lead Co.) (8 pbw), stearic acid (0.3 pbw), A-187 (3 pbw) and zinc oxide (5 pbw). On mixing with this blend a 1:1 mixture of levulinic acid and Santicizer 278 (2 pbw), a work life of 60 to 70 minutes is obtained with an overnight cure time required. The curing material becomes tack free in 1.25 hours. After 1 day, the cured material has a durometer of 33 Shore A after 4 days, 28 Shore A, and after 7 days, 26 Shore A. The tensile strength of the cured material was 88 psi with 300% elongation. The modulus at 100% elongation was 55 psi at 200%, 76 psi, and at 300%, 88 psi. The final permanent durometer reading was identical to the seven day value.

Insulated glass window units fabricated with this sealant showed an initial dew point of lower than −90° F. After the Canadian Standard 12GP8 Fog Test, the dew point remained at lower than −90° F. After 2 weeks at 140° F., 100% relative humidity, 2 units showed dew points of −42° and −36° F. respectively. No unit showed any angular fog.

* The Canadian Standard 12GP8 Fog Test appears unchanged in National Standard of Canada CAN 2-12.8-M76 Insulating Glass Units prepared by the Canadian Government. Specifications Board approved by the Standards Council of Canada. The test essentially consists of exposure of window units on one side to ultraviolet light while maintaining a controlled temperature differential across the unit for seven days and then performing a standardized viewing for internal fog or oily residue.

EXAMPLE 7

The following example illustrates the preparation of a one package chemical cure formulation using the levulinic acid zinc oxide cure system for polysulfide polymers.

Polysulfide polymer II (100 ppbw) zinc oxide (15 pbw) and 4A molecular sieves loaded with levulinic acid in a 9:1 weight ratio (10 pbw) are blended and packaged in a moisture proof container. The package stability at room temperature was longer than 3 weeks. Initially, the mixture required 2 to 3 days to cure at 90% rel. humidity and 3 days to cure at 50% rel. humidity. After 2 weeks storage cure time was 1 day at 90° rel. humidity and 2 days at 50% rel. humidity. Initially, the mixture required overnight to become tack free at 90% rel. humidity and 48 hours at 50% rel. humidity. After 2 weeks storage, 4 hours was required at 90% rel. humidity and 8 hours at 50% rel. humidity. Durometers on various cured samples ranged from 28 to 32 Shore A. The tensile of a cured sample was 125 psi (estimated) and the elongation 425% (estimated).

The subject matter which applicant regards as his invention is particularly pointed out and distinctly claimed as follows:

1. A cured rubbery composition based on a thiol terminated liquid polysulfide polymer which comprises the reaction product of a thiol terminated liquid polysulfide polymer, zinc oxide, and levulinic acid said zinc oxide being present at from about 1 part by weight to about 50 parts by weight per one hundred parts by weight of polysulfide polymer and said levulinic acid being present at about 0.5 parts by weight to about 5 parts by weight per one hundred parts by weight of polysulfide polymer.

2. A process for the preparation of a cured polysulfide rubber based on a thiol terminated liquid polysulfide polymer, said cured rubber being capable of extrusion under heat and pressure with recovery of substantially its original physical properties on cooling which comprises:
   (a) blending a thiol terminated liquid polysulfide polymer, from about 1 part by weight to about 50 parts by weight zinc oxide per hundred parts by weight of polysulfide polymer and from about 0.5 parts by weight to about 5 parts by weight levulinic acid per hundred parts by weight of polysulfide polymer; and
   (b) allowing the blend prepared in step (a) to cure.

3. An article of manufacture comprising a substrate having on at least one surface thereof a cured rubber extruded under heat and pressure, said rubber comprising the reaction products of a thiol terminated liquid polysulfide polymer, from about 1 part by weight to about 50 parts by weight zinc oxide per hundred parts by weight of polysulfide polymer and from about 0.5 parts by weight to about 5 parts by weight levulinic acid per hundred parts by weight of polysulfide polymer.

4. A process for the preparation of an article of manufacture comprising a substrate having a cured rubber based on a thiol terminated liquid polysulfide polymer on at least one surface thereof which comprises:
   (a) extruding a thiol terminated liquid polysulfide polymer based rubber cured with from about 1 part by weight to about 50 parts by weight zinc oxide per hundred parts by weight of polysulfide polymer and from about 0.5 parts by weight to about 5 parts by weight levulinic acid per hundred parts by weight of polysulfide polymer under heat and pressure onto a substrate; and
   (b) allowing said extruded rubber of step (a) to cool and solidify.

5. A curable composition which comprises a thiol terminated liquid polysulfide polymer, zinc oxide and levulinic acid said zinc oxide being present at from about 1 part by weight to about 50 parts by weight per hundred parts by weight of polysulfide polymer and said levulinic acid being present at about 0.5 parts by weight to about 5 parts by weight per one hundred parts by weight of polysulfide polymer.

6. A composition as defined in claims 1 or 5 containing from about 2 parts by weight to about 20 parts by weight and from about 1 part by weight to about 3 parts by weight levulinic acid per hundred parts by weight of polysulfide polymer.

7. A process as defined in claims 2 or 4 wherein the zinc oxide is originally present at from about 2 parts by weight to about 20 parts by weight and the levulinic acid is originally present at from about 1 part by weight to about 3 parts by weight per hundred parts of polysulfide polymer.

* * * * *